Figure 1:
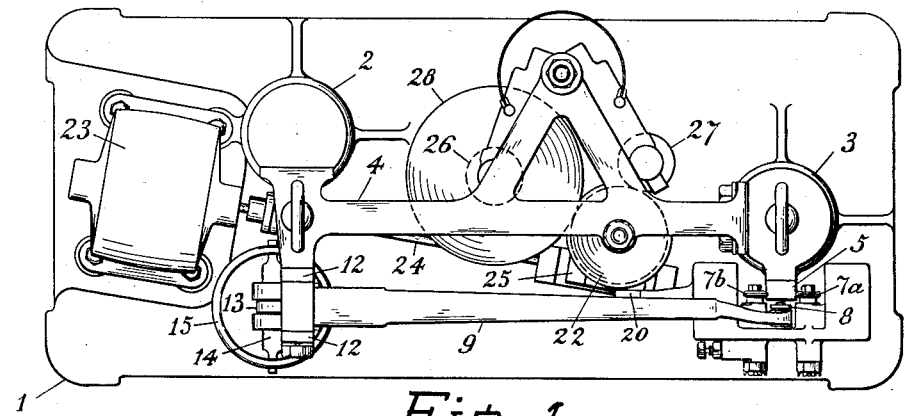

Nov. 13, 1923.

B. LIEBOWITZ 1,473,911

VIBRATION RECORDING APPARATUS

Filed Nov. 12, 1921

2 Sheets-Sheet 1

INVENTOR.
BENJAMIN LIEBOWITZ
BY
ATTORNEY.

Nov. 13, 1923.                                          1,473,911
                        B. LIEBOWITZ
                 VIBRATION RECORDING APPARATUS
                    Filed Nov. 12, 1921        2 Sheets-Sheet 2
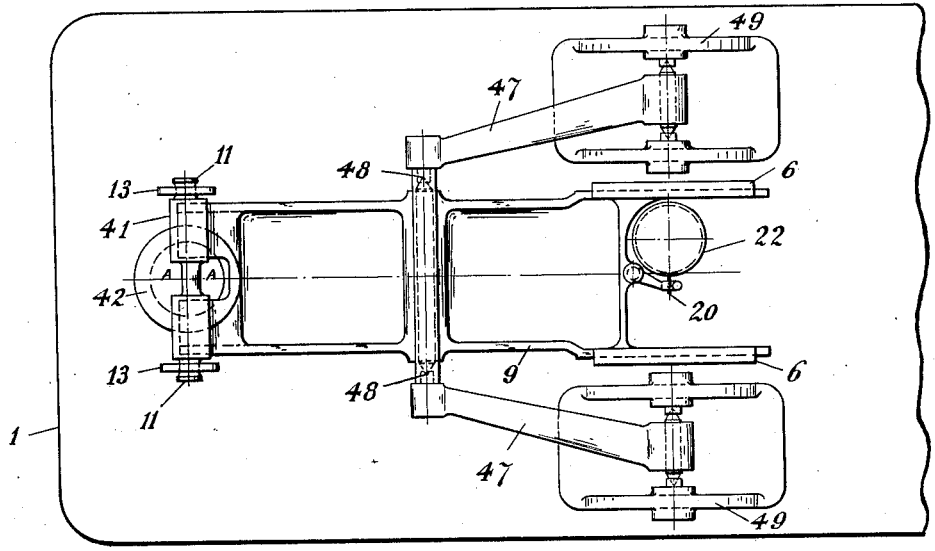
Fig. 4
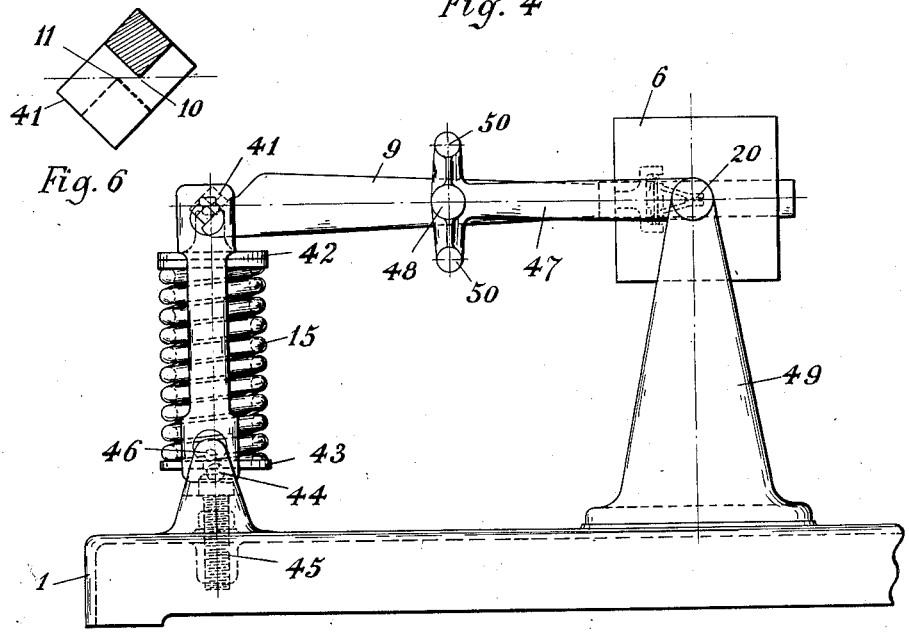
Fig. 6
Fig. 5
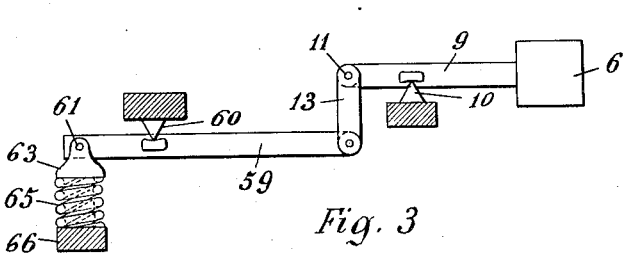
Fig. 3
INVENTOR.
BENJAMIN LIEBOWITZ
BY
ATTORNEY Patented Nov. 13, 1923.

1,473,911

UNITED STATES PATENT OFFICE.

BENJAMIN LIEBOWITZ, OF NEW ROCHELLE, NEW YORK.

VIBRATION-RECORDING APPARATUS.

Application filed November 12, 1921. Serial No. 514,507.

*To all whom it may concern:*

Be it known that I, BENJAMIN LIEBOWITZ, a citizen of the United States, residing at the city of New Rochelle, county of Westchester, and State of New York, have invented certain new and useful Improvements in Vibration-Recording Apparatus, of which the following is a specification.

My invention relates to means for recording the vertical vibrations and oscillations of vehicle bodies such as automobiles or railroad cars, and is similar in basic principle to seismographs employed in recording earth vibrations.

The objects of my invention are to produce a device of this character which will be portable, which can be set in the car body and driven over any ordinary road, and which will accurately record both the large and small vertical motions of the body.

I accomplish these objects by means of an elastically mounted weight having a very long period of oscillation, as will be hereinafter set forth.

The attempts which have heretofore been made to devise vibration recording apparatus for this purpose, using a spring-supported weight, have resulted in a device in which the oscillations of the vehicle body and those of the weight were hopelessly intermixed. The reason for the failure of the prior apparatus is that the period of the weight was much too short.

In a paper presented before the Society of Automotive Engineers in January, 1920, I showed that, for such an apparatus to work successfully, the period of the weight should be four or five times as long as the longest period of oscillation of the vehicle body and that therefore such instruments must have a period of the order of 3 or 3½ seconds. But to obtain such long periods the static deflection of the spring must be of the order of 9 or 10 feet; that is, when the weight is hung by the spring, the latter must be such that it will stretch or deflect 9 or 10 feet.

If, therefore, the weight were directly hung from a coil spring, as in the ordinary seismograph, the instrument would be so high that its use as a practical device for recording vehicle vibrations would be precluded.

One way of overcoming this difficulty is by the use of the lever suspension. In the paper above mentioned I showed that the lever suspension multiplies the static deflection of its spring by the lever arm ratio. If for example, this ratio is 20:1, and the static deflection of the spring is 6 inches, due to the weight supported at the long end of the lever, then the lever suspension will act like a simple spring whose static deflection=6×20=120 inches. This will give the weight a 3½ second period, which is long enough for all practical vehicle purposes.

The lever suspension is not new, but, so far as I know, it has not been realized before that it multiplies the static deflection of its spring by the lever arm ratio and thereby provides a means for obtaining very large static deflections in a comparatively small space. This is the new result which I have obtained with the lever suspension.

From the record traced by the instrument, the vertical displacements, velocities and accelerations of the vehicle body can be obtained by measurement or analysis, and also the periods, amplitudes and damping of the oscillations. In order to facilitate analysis and interpretation of the records, I prefer to so mount the weight or "inertia element" that it moves in a rectilinear path, or at least so that the center of oscillation of the system, where the marker is attached, travels in a rectilinear path.

Figure 2:
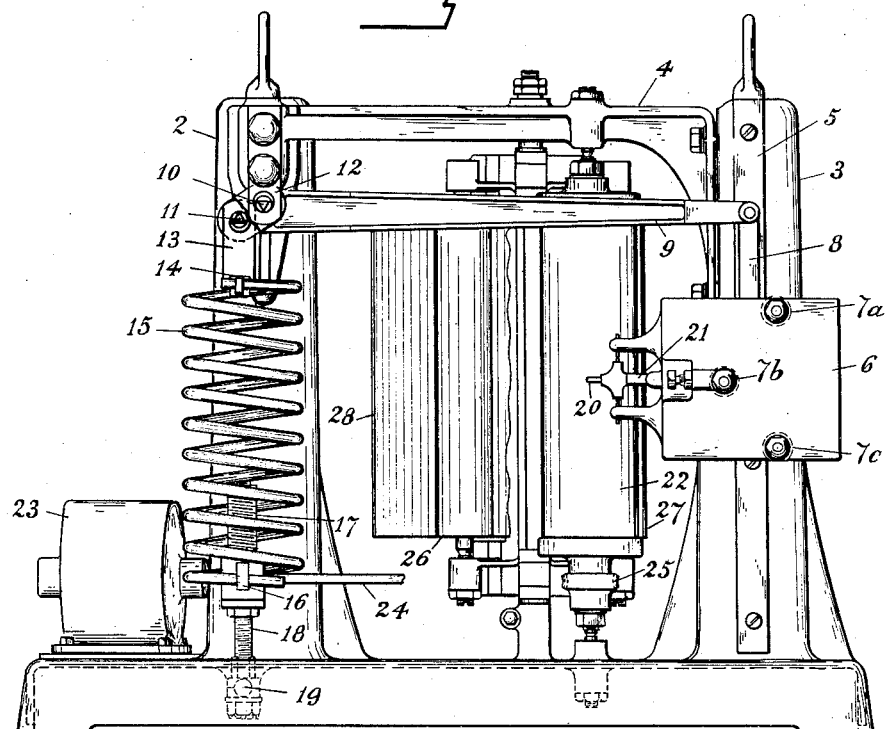

In the drawings, Fig. 1 shows a plan view of one embodiment of my invention; Fig. 2 is an elevation thereof, and Fig. 3 is a diagram of a modification in which the spring is replaced by a second lever suspension. Fig. 4 is a plan view of another embodiment. Fig. 5 is an elevation thereof, and Fig. 6 is a partial section on line AA of Fig. 4 showing a detail of the rocker-pivot construction.

Referring to Figs. 1 and 2, 1 is a base carrying the supports 2 and 3 which are braced by the bridge-piece 4. A grooved slide 5 is fastened to the support 3. The "dead-point" of the instrument is provided by the weight or inertia element 6, which is provided with rollers $7^a$, $7^b$, and $7^c$ fitting into grooves in slide 5, so as to guide the weight 6 in a straight vertical path. As indicated, rollers $7^a$ and $7^c$ operate in groove on one side of slide 5, while roller $7^b$ is midway between $7^a$ and $7^c$ and operates in the opposite groove in slide 5. The rollers may be ball-bearings, and may be mounted on studs as indicated, or in any convenient manner. The stud that carries the roller 7<sup>b</sup> is preferably made eccentric, so that by rotating that stud, adjustment of the rollers on the slide may be effected. The weight should operate on the slide with little friction, but it is even more important that shake be eliminated or minimized.

8 is a connecting rod by means of which weight 6 is hung from the long end of the aluminum lever 9. At the other end of the lever are inserted knife-edge pivots 10 and 11, as close together as they can conveniently be placed. Depending from bridgepiece 4, and securely bolted thereto are two hardened stirrups 12—12, with holes to receive the knife-edge pivot 10. A hardened shackle 13, with hole to receive knife-edge 11, connects 11 with the tension spring 15 by means of crossbar 14. The end of lever 9 is forked, as shown, to receive shackle 13. Another crossbar 16 at the lower end of the spring 15 is provided with a threaded hub to receive hollow bolt 17, which in turn is threaded to receive bolt 18. The latter is pivoted at 19 on the under side of the base 1. Bolts 17 and 18 provide the spring adjustment.

In practice, a lever ratio of 20:1 is easily obtained. The spring is so designed that it will deflect about 6 inches, due to the load caused by the weight at the long end of the lever. This gives an equivalent "static deflection" of 120 inches, which, as mentioned, gives a period of about 3½ seconds.

The range of movement of the weight 6 on the slide 5 should be sufficient to take care of the larger movements which frequently occur in vehicle bodies even when the conditions are moderately severe. In practice, I provide about a ten inch range, five inches on either side of the mid-position.

Pivotally carried on weight 6 is the marker 20 which is pressed against the recording drum 22 by spring 21. Recording drum 22 is driven by motor 23 through shaft 24 and gear 25. A paper mechanism is provided, which may consist of two drums or spindles 26 and 27, mounted in any suitable way; the paper roll 28 unwinding say from 26 over 22 and onto 27 as the recording drum 22 is rotated.

Referring now to Fig. 3, there is shown diagrammatically a weight 6 carried by lever 9 which is pivoted at 10 and carries shackle 13 pivoted to lever 9 at 11; these parts corresponding to the like-numbered parts in Figs. 1 and 2. Instead of being directly attached to a spring, however, as in Figs. 1 and 2, shackle 13 is pivoted to lever 59, which is pivoted to the frame-work at 60 and to a spring-head 63 at 61. Abutting the spring-head 63 is a compression spring 65 which is supported on the base at 66. In the modified construction indicated in Fig. 3, the spring 15 is replaced by a second lever suspension. In this way still longer periods can be obtained, such, for example, as might be required in marine work. Of course the number of levers may be increased ad libitum.

Referring now to Figs. 4, 5, 6, another embodiment is shown, with however certain parts, such as the paper mechanism and drive, omitted for clearness. In this embodiment, a point in the weight is guided in a substantially straight, vertical path by a "straight-line linkage" instead of by means of a slide.

Here the weight 6—6 is divided into two parts and mounted directly on the lever 9. The rocker pivots 10 and 11 are cut from a single piece of steel 41; pivot 10 being in the center, and pivot 11 being divided into two parts, one at each end of 41. The object of this construction is to get the pivot edges 10 and 11 as close together as possible, in order to have as large lever-ratio as possible. Piece 41 is rigidly fastened to the end of the lever 9 in any suitable manner and becomes a part thereof.

Pivot 10 bears against a seat in spring-head 42 which transmits the load to the compression spring 15 carried on the lower spring-head 43 pivoted at 44. Pivot 44 is carried by screw 45, by which adjustment is obtained. The load on pivot 11 is transmitted through the shackles 13 to the base pivots at 46.

It will be noted that this spring-mounting does not constrain the lever so far as motions along its longitudinal axis are concerned. This constraint is furnished by the arms 47 pivoted to the lever 48, substantially midway between marker 20 and pivot 10, and pivoted to the pedestals 49 mounted on base 1. The arms 47 are braced together by cross-pieces 50 to provide lateral stiffness. This combination of levers constitutes a modified form of "straight-line linkage" and compels the marker 20 to move in a substantially rectilinear path.

In this construction, the weights 6—6 rotate as they move up and down; the "dead-point," therefore will not be at the center of gravity of the weight, but at the center of oscillation of the entire lever system. This can be found by calculation; or the weights 6 can be slid along the lever 9 until, by trial, it is found that the center of oscillation coincides substantially with the marker 20. It may be pointed out, however, that if the weights are heavy compared with the lever, and the latter are fairly long, the center of oscillation will not be far distant from the center of gravity of the weights.

It may further be pointed out that with this system of levers, the record can be simplified. Thus, for example, if the weights 6 are fastened to the lever in the neighborhood of the pivots 48, instead of at the end, the motions of the vehicle body will be recorded twice their actual size.

I have shown no means for damping the oscillations of the weight, because, with the long periods employed, there will generally be sufficient friction in the pivots, etc. to provide sufficient damping.

My invention is not to be construed as limited to the specific embodiments shown.

I claim:

1. In a vehicle vibration recording apparatus, a pivoted lever, having a long and short arm, a weight connected thereto at the end of its long arm, and a spring connected thereto at the end of its short arm, the lever-ratio and spring deflection being such that the period of the system is long in comparison with the periods of oscillation of the vehicle body.

2. In a vehicle vibration recording apparatus, a pivoted lever having a long and a short arm, a spring connected to the short arm, a vertically guided weight supported by the long arm, the lever-ratio and spring deflection being such that the period of the system is long in comparison with the periods of the vehicle body, and a marker carried by said weight at substantially the center of oscillation of the system.

3. In a vehicle vibration recording apparatus, a pivoted lever having a long and a short arm, a spring connected to the short arm, a weight supported by the long arm, and a marker carried by said weight at substantially the center of oscillation of the system, said marker being guided to travel in a substantially rectilinear path, the ratio of arms of said lever and the deflection of said spring being such that the period of oscillation of the system is long in comparison with the periods of the vehicle body.

4. In a vibration recording apparatus, a weight, a spring, and a plurality of levers co-operating with said spring in resiliently supporting said weight, the deflection of said spring and the effective lever-ratio of the combined levers being such that the period of the weight is long in comparison with the periods of the body whose vibration it is desired to record.

BENJAMIN LIEBOWITZ.